US007933053B2

(12) United States Patent
Dalal et al.

(10) Patent No.: US 7,933,053 B2
(45) Date of Patent: Apr. 26, 2011

(54) FINE TUNING COLOR DICTIONARIES

(75) Inventors: Edul N. Dalal, Webster, NY (US);
Wencheng Wu, Webster, NY (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1180 days.

(21) Appl. No.: 11/607,643

(22) Filed: Dec. 1, 2006

(65) Prior Publication Data
US 2008/0130022 A1 Jun. 5, 2008

(51) Int. Cl.
*G03F 3/08* (2006.01)
(52) U.S. Cl. ......... 358/518; 358/1.6; 358/1.9; 358/3.23; 358/504; 358/535; 382/167; 382/156
(58) Field of Classification Search ............. 358/1.6, 358/1.9, 3.23, 504, 518; 382/167, 156
See application file for complete search history.

(56) References Cited

U.S. PATENT DOCUMENTS

| | | | | |
|---|---|---|---|---|
| 5,309,246 | A * | 5/1994 | Barry et al. | 358/1.9 |
| 5,649,072 | A * | 7/1997 | Balasubramanian | 358/1.9 |
| 6,157,469 | A | 12/2000 | Mestha | |
| 6,344,902 | B1 | 2/2002 | Duke et al. | |
| 6,621,498 | B1 | 9/2003 | Handley et al. | |
| 6,744,531 | B1 | 6/2004 | Mestha et al. | |
| 6,766,051 | B2 | 7/2004 | Klassen et al. | |
| 7,616,346 | B2 * | 11/2009 | Stevens | 358/3.01 |
| 2002/0093684 | A1 | 7/2002 | Bares et al. | |
| 2005/0030560 | A1 | 2/2005 | Maltz et al. | |

OTHER PUBLICATIONS

Raja Balasubramanian et al, Refinement of printer transformations using weighted regression, 1996, SPIE vol. 2658, pp. 334-340.*
U.S. Appl. No. 11/507,405, filed Aug. 21, 2006, Hancock et al.

* cited by examiner

*Primary Examiner* — King Y Poon
*Assistant Examiner* — Jamares Washington
(74) *Attorney, Agent, or Firm* — Fay Sharpe LLP

(57) ABSTRACT

A spot color dictionary is fine tuned or updated. Localized color production models are determined for spot colors of interest to be produced by an associated document processing system or printer. Measurements are made of colors of produced spot colors. Optionally, measurements are made of colors of test patches that are based on perturbations from the colors of the spot colors. In determining a model for the production of a target spot color, measurement data related to colors that are closer in color space to a given target color is given a higher weight than is measurement data related to colors that are further in color space from the target color. Accordingly, the model is localized to the region of color space about the target color and therefore, more accurately predicts a colorant recipe for the target color than would interpolation based on a full gamut, or more general model.

20 Claims, 3 Drawing Sheets

FINE TUNING COLOR DICTIONARIES

BACKGROUND

The present illustrative embodiments are related to methods and systems for fine tuning, updating, revising, customizing or recalibrating color dictionaries, such as spot color dictionaries, associated with document processing systems. Embodiments will be described with reference to the four common subtractive colorants: cyan, magenta, yellow and black (CMYK). However, embodiments can readily be adapted for systems that use different, additional or fewer colorants.

Spot colors are colors of particular importance in a particular document, such as the color of a logo or product package or label or portion thereof. Traditionally, portions of documents calling for a particular spot color have been rendered with a matching ink in, for example, printing processes, such as offset printing.

Digital printing systems, such as electrophotographic or xerographic printing systems and/or ink jet printing systems, generate the perception of various colors by laying down varying amounts of a fixed set of colorants, such as cyan, magenta, yellow and black (CMYK) toners or inks, and are not usually readily adapted to printing a spot color through the application of a particular ink matching the particular spot color. Nevertheless, there is a desire to produce spot colors, or at least the perception of spot colors, using digital printing systems, in a manner that approaches the accuracy and consistency achievable through the use of specialized spot color inks.

Accordingly, document processing systems are sometimes preloaded with color or spot color dictionaries by a document processing system manufacturer. Such color dictionaries map spot color names and/or spot color definitions to specific colorant combinations. For example, a color name is associated with a color definition or target color measurement value in terms of some machine-independent color space description, such as, for example, the L*a*b* of the International Commission on Illumination (Commission Internationale d'Eclairage). The color dictionary associates a given name and definition, or target color measurement value, with a colorant recipe or combination of colorant values.

For example, a color dictionary preloaded in a particular document processing system may be based on a fleet or product line average color production behavior for a given manufacturer's printing fleet or for a particular model printer or print engine. Alternatively, a color dictionary may be based on a particular unit's color production behavior over its entire gamut and at a particular point in time and under a particular set of environmental circumstances, such as, soon after manufacture or prior to shipment to a customer.

While such dictionaries often provide good color matching and consistency, it is possible that a fleet average colorant recipe produces a perceived color that is undesirably far from the associated target or defined color. Additionally, due to wear and environmental factors, such as temperature and humidity, even a spot color recipe that produced the perception of a perfect match to a target spot color at the time of manufacture or calibration can produce a color that is perceived to be unacceptably far from the target color after the document processing system has been installed and operated over a period of time. Typically, such drifts or differences from the fleet average or median are compensated for with a global or gamut-wide document processing system recalibration. Such recalibrations generate global compensating lookup tables or derive new control element set points which tend to drive the overall color reproduction performance of the document processing system back toward some standard or fleet average. New spot color recipes may be derived from global models of system performance that are derived during these recalibrations and used to update spot color dictionaries.

However, such global recalibrations and/or system characterizations are based on measurements taken at relatively large intervals over each of the dimensions of device-dependent color space (e.g., CMYK). Therefore, it is not likely that a spot color will fall exactly on a compensating lookup table node. Accordingly, new spot color recipes are generally based on interpolations, such as tetrahedral interpolation between relatively widely spaced nodes of a lookup table. Such interpolations often assume a linear color production response. However, such assumptions do not always provide the accuracies required or desired in the production of spot colors. Increasing accuracy by increasing the resolution of compensating lookup tables is prohibitively expensive due to increased memory requirements and calibration process complexity.

Accordingly, there is a desire for methods and systems that provide improved fine tuning, customization and/or recalibration of color dictionaries, such as, for example, spot color dictionaries.

BRIEF DESCRIPTION

A method for updating a spot color dictionary of spot color recipes associated with a document processing system can include determining localized models of the color production behavior of the associated document processing system, transforming color definition information through the respective localized models to determine respective updated colorant recipes and updating respective spot color dictionary entries of the spot color dictionary, for the respective spot colors, according to the respective determined updated colorant recipes.

For example, determining localized models can include determining, for each respective spot color of interest of the spot color dictionary, a respective localized model of a color production behavior of the document processing system, wherein each respective localized model is determined based on a weighted evaluation of the color production behavior of the document processing system, wherein data regarding the production of colors that are relatively close in color space to a respective color space position of the respective spot color for which the respective localized model is being determined is given a higher weight than is data regarding the production of colors that are relatively far from the respective color space position of the respective spot color for which the respective model is being determined.

Transforming color definition information can include transforming respective color definition information of each respective spot color, for which a respective localized model is determined, through the respective localized model, thereby determining a respective updated colorant recipe for each respective spot color.

Some embodiments include selecting at least one respective spot color recipe from the spot color dictionary for evaluation, wherein each respective spot color recipe includes a respective set of colorant values for producing a respective spot color and is associated with a respective spot color target color measurement value, producing at least one respective test patch according to the selected at least one respective spot color recipe, measuring a respective color of each respective test patch, thereby determining a respective measured color value for each respective test patch and comparing each respective measured color value to the respective spot color target color measurement value associated with the respective spot color recipe, thereby determining a respective color error associated with each respective spot color recipe.

For instance, the respective set of colorant values and the respective measured color value of each respective test patch can be included in a linked list. For example, respective values are included for each respective spot color having a respective spot color recipe that is associated with a color error that is above a predetermined color error threshold. A respective localized model of local color production behavior of the document processing system can then be determined. For example, the respective localized model is respectively localized for each respective spot color based on a weighting of information included in the linked list, wherein the weighting of the information included in the linked list is a respective weighting of information associated with each respective member of the linked list and wherein the respective weighing is a function of a color distance between the respective spot color target color measurement value associated with the respective spot color for which the respective localized model is being determined and the respective measured color value associated with the respective member of the linked list, wherein information regarding respective members of the linked list associated with a relatively shorter color distance to the respective spot color target color measurement value associated with the respective spot color for which the model is being determined is given a relatively higher weight and wherein information regarding respective members of the linked list associated with a relatively longer color distance to the respective spot color target color measurement value associated with the respective spot color for which the model is being determined is given a relatively lower weight.

Embodiments can also include transforming the respective spot color target color measurement value associated with each respective spot color having a respective spot color recipe that is associated with a color error that is above the predetermined color error threshold through the determined respective localized model, thereby determining a respective updated or revised set of colorant values for each respective spot color having a respective spot color recipe that was associated with color error that was above the predetermined color error threshold.

Some embodiments of document processing systems that are operative to perform the methods described above can include, for example, a spot color dictionary, a local model determiner, a color definition transformer and a dictionary updater.

For instance the spot color dictionary includes spot color entries associating colorant recipes with spot color definitions.

The local model determiner can be operative to determine localized models of a color production behavior of the document processing system based on a weighted analysis of color production measurements, wherein color production measurements associated with colors that are located in color space relatively close to a point in color space associated with the target spot color for which the localized model is being determined are given a greater weight than are color production measurements associated with colors that are located in color space relatively far from the point in color space of the target spot color, wherein the localized models relate color definitions to colorant recipes.

The color definition transformer can be operative to receive a color definition associated with the target spot color and the determined localized model determined for the target spot color and determine an updated colorant recipe for the spot color definition of the target spot color using the localized model determined for the target spot color and the dictionary updater can be operative to receive the updated colorant recipe from the color definition transformer and to update the spot color dictionary entry for the target spot color, thereby updating the colorant recipe associated with the definition of the target spot color.

DETAILED DESCRIPTION

Figure 1:
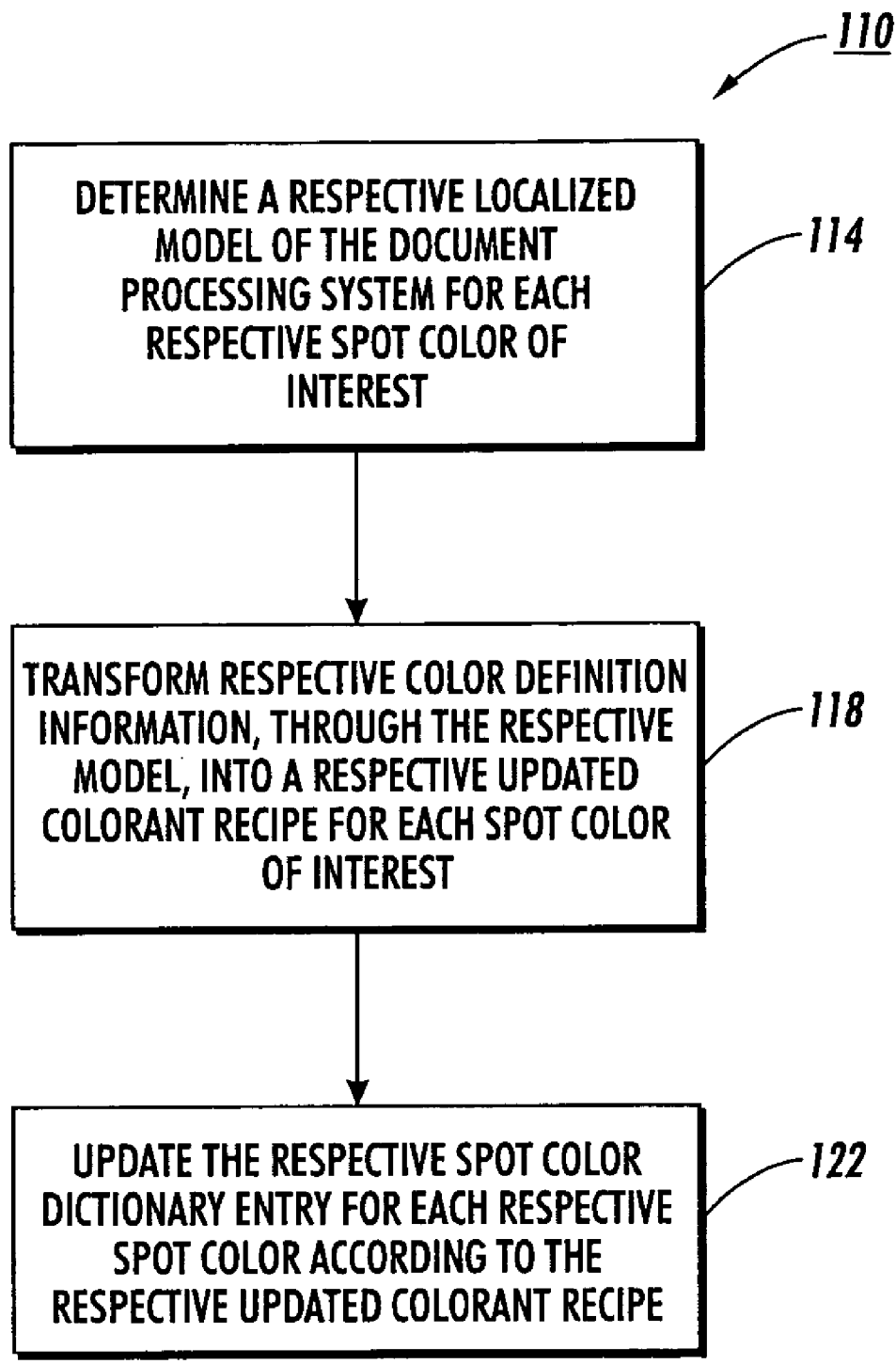
FIG. 1 is a flow chart outlining a method for updating color recipes associated with a document processing system.

A method 110 for updating a spot color dictionary associated with a document processing system can include determining 114 a respective localized model of the document processing system for each respective spot color of interest, transforming 118 respective color definition information through the respective model into a respective updated colorant recipe for each respective spot color of interest and updating 122 the respective spot color dictionary entry for each respective spot color according to the respective updated colorant recipe.

Determining 114 a localized model of document processing system performance or behavior can include determining 114 a model based on a weighted analysis or consideration of color production information regarding the document processing system. For instance, color production information regarding colors that are close to the color of interest is given a higher weight than is color production information regarding colors that are further from the color of interest. If the weighting function selected is non-linear, such as, for example, a quadratic or higher power weighting function, the local nature of the model can be increased over that of models based on lower power or linear drop-off weighting functions.

The distance between the target color or color of interest and other colors can be determined in terms of any appropriate color distance formula. For example, color positions can be compared in terms of Euclidian distance in L*a*b* space or in terms of $\Delta E_{2000}$.

For example, test patches can be printed based on a current spot color dictionary colorant recipe of a target spot color or color of interest. Additionally, in some embodiments or applications, test patches of colors neighboring the target spot color can be printed.

For instance, a particular print job may call for production of several named or spot colors that are located in a particular region of color space. Accordingly, a test patch may be printed for each of the spot colors included in the print job. Each spot color of the print job is, in its turn, considered a target color. When a particular color is selected as the target color, the remainder of the named or spot colors may be considered neighboring colors.

A color of each of the test patches is measured. For instance, each of the test patches is rendered based on a different colorant recipe, such as, for example, a different combination of CMYK colorants. A color sensor and reference light source (e.g., a spectrophotometer or other color measurement device) are used to measure a color of each of the test patches. For instance, a respective measured color value in terms of a machine-independent color space, such as L*a*b*, is determined for each respective test patch.

As each spot color is considered a target spot color, the measured color values and colorant recipes used to produce the test patches from which the measured color values were determined are used to determine 114 a localized model for the behavior of the document processing system in a color space neighborhood or vicinity of the target color.

For instance, machine-independent color space definitions or target color measurement values of each of the spot colors for which test patches and measurements were made are compared in order to determine respective color distances between the spot colors and the current target spot color. These distances are then used to determine a relevance or significance of each colorant recipe/measurement pair for determining 114 a localized model of document processing system performance with regard to the currently selected target color. For instance, the distances are used in a function for determining a weighting factor. For example, the weighting factor function may be a linear or non-linear function of color distance wherein the weight or significance given to each colorant recipe/color measurement pair falls off as a function of distance. Coefficients and/or exponents applied to the distance information can be used to control the localization or localized nature of the model.

As discussed in greater detail below, some embodiments determine 114 the localized models through the use of moving matrix interpolation. Alternatively, other techniques can be used. For instance, neural networks can be used to determine 114 localized document processing system models for target colorants.

Alternatively, the named or spot colors to be included in a print job are not solely relied upon to provide information for determining 114 a localized printer model. For instance, a print job may only call for one spot color. In some applications, the spot colors called for in a particular print job may be significantly different from or located in color space too far from each other, or from a target spot color, to be of use in determining 114 a localized model for each other or for a target spot color of interest.

In these embodiments or applications, additional colors may be selected by a document processing system operator for inclusion in the above-referenced test print or test patch production.

Alternatively, perturbation test patches based on perturbations from a selected target color, are produced, measured and processed as described above. For example, the perturbations may be based on fixed distances in machine-independent or machine-dependent color space. That is, pre-selected offsets may be applied to a machine-independent color space definition of a target color and converted back to machine dependent colorants, or directly to a machine-dependent colorant recipe currently associated therewith. Alternatively, as discussed in additional detail below, perturbation test patches may be produced after an initial color error determination and the perturbation distance may be a function of a color error associated with the target color or measured color value of a test patch associated therewith.

Once a current or updated localized model of the document processing system is determined 114 for a particular target color, color definition information for that color can be transformed 118 through the respective determined 114 model to generate an updated colorant recipe for the target color. For example, a particular named or spot color is associated with a particular color definition. The color definition may be associated with a color name and with a machine-independent color space, such as, for example, in terms of the L*a*b* color space. Accordingly, such machine-independent color space parameters (e.g., L*, a*, b*) are processed through or with, or are transformed 118 by the determined 114 local model, thereby generating a new, updated or revised colorant recipe for producing the target named or spot color according to the color production behavior of the document processing system in a region of color space local to the target color.

Once a color definition has been transformed 118 into an updated or revised colorant recipe, the spot color dictionary entry for the respective color can be updated 122. That is, for example, colorant values, such as, for example, digital count values for the colorants used by the document processing system (e.g., cyan, magenta, yellow and/or black digital count values (e.g., 0-255)) associated with the spot color entry for the target spot color can be replaced with updated values. For instance, a database entry is updated or revised.

Figure 2:
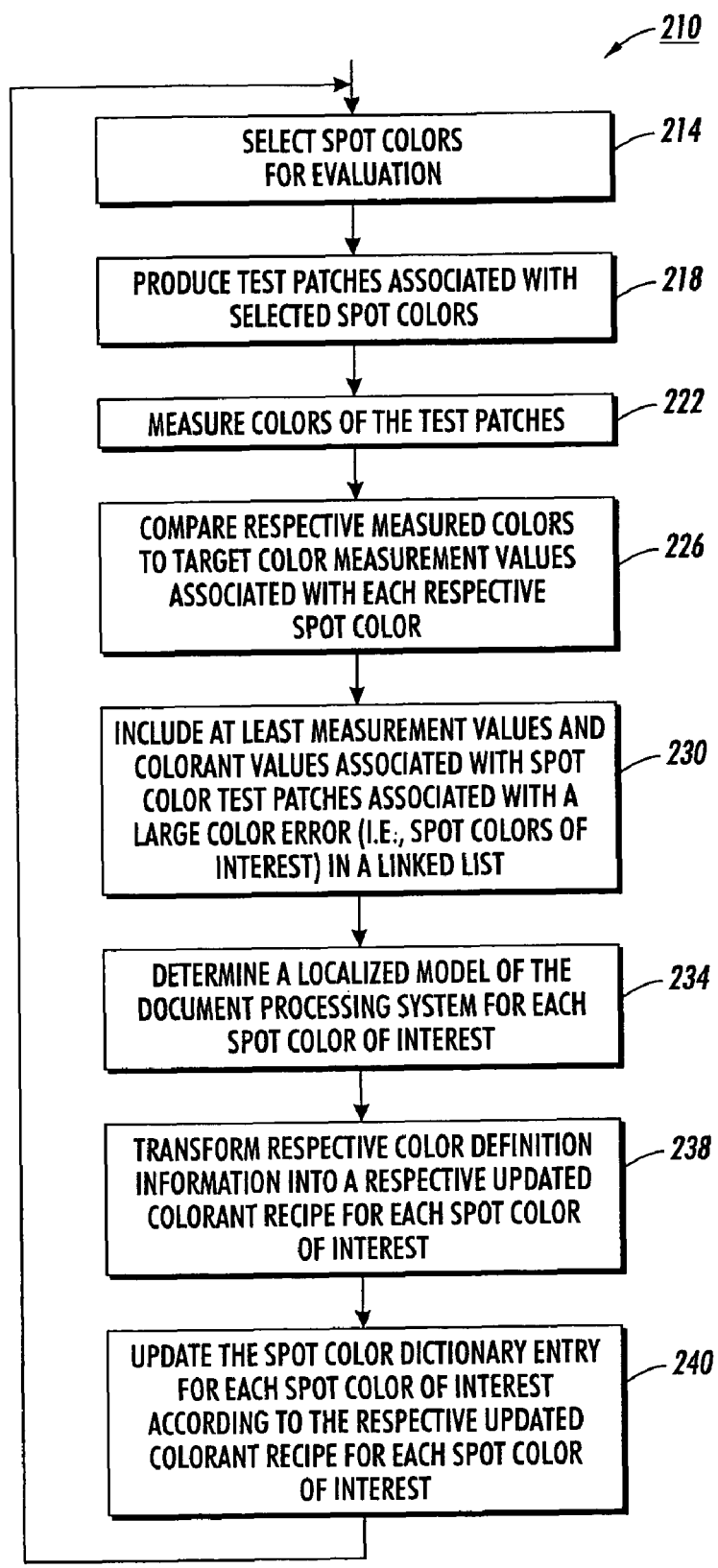
FIG. 2 is a flow chart outlining embodiments of the method of FIG. 1.

Referring to FIG. 2, an illustrative embodiment 210 of a method for updating a spot color dictionary of spot color recipes associated with a document processing system includes selecting 214 spot colors for evaluation, producing 218 test patches associated with the selected spot colors, measuring 222 colors of the test patches, comparing 226 respective measured colors to target color measurement values associated with each respective selected spot color, thereby determining a color error associated with each respective selected spot color, and including 230 in a linked list, at least measurement values and colorant values associated with spot color test patches that are associated with a large color error (based on the comparison 226). It may only be necessary or desirable to update the spot color entries for spot colors associated with a large error or other selected subsets of colors included in a color dictionary. Accordingly, such colors are referred to herein as spot colors of interest.

The illustrative method 210 also includes determining 234 a localized model of the performance or behavior of the document processing system for each spot color of interest, transforming 238 respective spot color definition information into a respective updated colorant recipe for each spot color of interest and updating 240 the spot color dictionary for each spot color of interest according to the respective updated colorant recipe.

In some embodiments or applications, it may be desirable to repeat or perform several iterations of the illustrative method 210. For example, in a second pass, only the spot colors of interest for which colorant recipes were updated or which were associated with unacceptably large color errors during the previous pass might be selected 214 for further evaluation.

Accordingly, selecting 214 spot colors for evaluation can include selecting the named or spot colors associated with a particular document production job. Alternatively, selecting 214 spot colors for evaluation can include selecting all the spot colors in a spot color dictionary. In still other alternatives, selecting 214 spot colors for evaluation can include selecting spot colors associated with a document production job as well as spot colors neighboring the spot colors of the job. Additionally, or alternatively, selecting 214 spot colors for evaluation can include selecting spot colors from the spot color dictionary which are known to be associated with color errors that are larger than some color error threshold of acceptability.

Producing 218 test patches associated with the selected spot colors can include producing test patches of the spot colors based on current or recently updated spot color recipes associated therewith in the spot color dictionary. Additionally, or alternatively, producing 218 test patches associated with selected spot colors can include producing perturbation test patches associated with some or all of the selected 214 colors. For example, if the number, or color space distribution, of the selected 214 colors is such that it is known, or likely, that there will be an insufficient number of test patches of colors that are local to certain ones of the selected 214 target colors for determining 234 localized models therefor, appropriate perturbation test patches can be produced. For example, the perturbation test patches may be based on a set of fixed offsets or fixed percentages from or of the colorant values of the colorant recipes of the target spot colors. For instance, the colorant values of perturbation test patches might be selected to be the colorant values of the current recipe of the target spot color plus or minus some small percentage, such as, for example, 5 or 10 percent. Alternatively, the perturbance test patches may be based on a fixed offset, such as, +/−10 digital counts. Additionally, or alternatively, several levels of perturbation (e.g., 5 and 10 percent) can be used. It is noted that for a given target spot color and one level of perturbation, as described above, 81 different perturbation test patches could be produced (i.e., +10, 0, 0, 0; −10, 0, 0, 0; +10, −10, 0, 0; . . . 0, 0, 0, −10). However, experiments indicate that it is often sufficient to use a reduced number of perturbation test patches. For example, acceptable results have been achieved using just two perturbation test patches (e.g., +10, +10, +10, +10; −10, −10, −10, −10).

As indicated above, in some embodiments, the level of perturbation can be a function of the color error associated with the target spot color. For example, where a color error for a spot color is large, it may be appropriate to provide perturbation test patches that are further from the inaccurate spot color recipe in order to improve the likelihood that the colorant recipes of the perturbation test patches will straddle or surround (i.e., in color space) the correct colorant recipe for the target spot color.

If perturbation test patches are determined in, for example, the four-dimensional CMYK color space and measurements and color definitions are in terms of a three-parameter machine-independent color space, such as, for example, L*a*b*, it is possible to select and render perturbation test patches that have the same or similar L*a*b* measurement values. Depending on the form of the localized model, this can have the effect of "ill conditioning" or causing discontinuities or non-monotonicities in the determined 234 model or transformation. Accordingly, care should be taken to avoid using or selecting perturbation test patches that conflict in this way.

Measuring 222 colors of the test patches can include, for example, using an off-line or in-line colorimeter or spectrophotometer to measure the color of the various test patches and/or perturbation test patches.

Comparing 226 respective measured colors to definitions or target color measurement values associated with each respective spot color can include, for example, computing the color difference ΔE between the measured colors of the test patches and their associated or respective target spot color definitions or target measurement values. Additionally, or alternatively, other statistical quantities, such as a ninety-fifth percentile error or an average error for a group of selected 214 spot colors can be determined. For instance, a decision to update the spot color dictionary can be made on the basis of individual color recipe errors. Alternatively, if the selected 214 spot colors, as a group or as a whole, are being reproduced with desired accuracy, it might be assumed that any individual outliers are the result of measurement error, are not particularly important, or that attempting to make corrections for the outliers might result in displeasing discontinuities or instabilities in overall system performance. Accordingly, the decision to update the spot color dictionary can be made on the basis of some measure of the color error of the group as a whole.

If entries for at least some of the spot colors are to be updated or revised, a linked list of data points is created. For example, at least the measurement values and colorant recipe values associated with spot color test patches having undesirably large color errors are included 230 in the linked list. For instance, if the spot color recipes, which are associated with large color errors, are concentrated in a particular region or regions of color space, then the measurement and recipe data associated with just these spot colors of interest may be sufficient basis for determining 234 localized models of the document processing system. However, in some embodiments or applications, it may be appropriate to include additional data points in the linked list. For example, the colorant recipes and measured color values associated with test patches that are not associated with undesirably large color errors can be included 230 in the linked list. Additionally, colorant recipes and measurement values associated with perturbation test patches, if available, can be included 230 in the linked list.

The linked list is a convenient data structure for accessing and processing the colorant/measurement data points to be used in determining 234 the localized model of the document processing system for each spot color of interest. For example, referring to Eq. (1):

$$T_Z = \underset{U}{\operatorname{argmin}} \left( \sum_{i=1}^{N} w_i \left\| \begin{bmatrix} C_i \\ M_i \\ Y_i \\ K_i \end{bmatrix} - U \cdot \begin{bmatrix} L_i \\ a_i \\ b_i \\ 1 \end{bmatrix} \right\|_2^2 \right) \text{ where,} \quad \text{Eq. (1)}$$

$$w_i = \frac{1}{((L_i - L)^2 + (a_i - a)^2 + (b_i - b)^2)^\alpha + \varepsilon}$$

a transformation matrix $T_z$ or localized model for a target spot color associated with spot color definition L*z a*z b*z, for determining the best colorant combination or recipe, in the weighted least square (WLS) sense, can be determined by solving the WLS problem expressed in Eq. (1). In Eq. (1), $w_i$ is a weighting factor determined for each element of the linked list discussed above. The parameters L, a, b represent components of the spot color definition of the target color measurement value. The parameters $L_i$ $a_i$ $b_i$ refer to elements of the color measurement value of each test patch produced according to a respective colorant recipe (e.g., $C_i$ $M_i$ $Y_i$ $K_i$) and included in the linked list. Accordingly, the denominator of the equation for calculating $w_i$ includes a calculation of a color distance between the measured color of element i of the linked list and the definition or target measurement value associated with the currently selected or target spot color.

The second term in the denominator, $\varepsilon$, is an offset to the denominator that prevents $w_i$ from becoming too large for elements of the linked list that are very close to the target color. The exponent α applied to the color space distance influences the degree to which the model or transformation matrix $T_z$ is localized. For a given color distance between the target color and the color of an element of the linked list, as a is increased, the weight ($w_i$) or influence that term has on the model transform $T_z$ is reduced. Accordingly, the higher the value of α, the closer a color from the linked list must be to the target color to provide a significant contribution in the determination of $T_z$.

The arg min function of the equation for $T_z$ returns the value of parameter matrix U for which the value of the bracketed expression is minimized. Accordingly, as used in Eq. (1), arg min returns the value for U which transforms sets of parameters $L_i$ $a_i$ $b_i$ with the smallest error (in the WLS sense) to colorant combinations or recipes $C_i$ $M_i$ $Y_i$ $K_i$ for the members of the linked list, wherein the influence of any particular entry in the linked list is controlled by the weighting factor $w_i$ associated therewith. Therefore, $T_z$ is a localized (or moving) transformation matrix describing the color production behavior of the document processing system in the vicinity of the target spot color (defined as Lab), wherein the scope of the vicinity or neighborhood is determined by the weighting factor $w_i$ and, therefore, parameters $\alpha$ and $\epsilon$.

Accordingly, transforming 238 color definition information into a respective updated colorant recipe can be achieved according to Eq. (2):

$$\begin{bmatrix} C \\ M \\ Y \\ K \end{bmatrix} = T \cdot \begin{bmatrix} L \\ a \\ b \\ 1 \end{bmatrix} \quad \text{Eq. (2)}$$

In the illustrative four colorant example, U and, therefore, T, is a 4×4 matrix which transforms (L,a,b) plus an offset to (C, M, Y, K). $\alpha$ and $\epsilon$ are considered smoothing and localization parameters. The selection of values for these parameters has an influence on the success of the model determination 234 and can affect the number of iterations required to achieve a desired color accuracy. In one study, values of $\alpha=1$ and $\epsilon=0.0001$ was used successfully.

As is apparent from inspection, Eq. (1) and (2) can be adapted to accommodate any machine-independent color space and any number of colorants and the methods 110, 210 are not limited to applications or embodiments associated with L*a*b* and CMYK color spaces or colorants.

Updating 240 the spot color dictionary entry for each spot color of interest according to the respective updated colorant recipe for each color of interest can include replacing or overwriting colorant values (e.g., CMYK) currently stored in the spot color dictionary (e.g., in a database entry, computer file, EEPROM or other computer memory) with new values generated through the application of Eq. 2.

In some instances, application of Eq. 2 might determine a colorant recipe which is beyond the capability of the document processing system. For example, the recipe might call for more than a maximum achievable amount or less than a minimum amount of one or more of the colorants (e.g., more than 255 or less than 0 digital counts in an 8-bit system). In such instances, the target spot color (Lab) may be determined to be outside the gamut of colors that is producible by the document processing system. In such occurrences, it may be desirable to redefine the spot color in question to a closest or best achievable color. In such instances, updating 240 the spot color dictionary may include, not only replacing the associated colorant recipe (CMYK), but may also include updating, replacing or providing an alternate spot color definition. For example, the Lab value associated with a named color in the spot color dictionary can be replaced. Alternatively, a flag and/or a pointer to a temporary alternate spot color definition may be included in the spot color definition entry of the spot color in question.

Such a procedure prevents unachievable spot colors from causing automated algorithms to force an undue number of iterations in an attempt to find a transform or localized model for a color that cannot be achieved.

As indicated previously, the illustrative method 210 may be repeated either to test the quality of the updated colorant recipes or to provide an opportunity to further improve the recipes.

For example, in a second pass, selecting 214 spot colors for evaluation can include selecting just those colors of interest for which colorant recipes were updated 240 (e.g., those colors previously associated with a large error). Producing 218 test patches associated with the selected colors can include producing 218 perturbation test patches. Since only spot colors which were previously associated with a large color error are selected in this illustrative second pass, the number of colors and, therefore, the number of test patches produced, is likely to be reduced from the original number of colors. Accordingly, it may be practical or desirable to include some or additional perturbation test patches in this illustrative second pass. All of the produced 218 test patches are measured 222. However, only the measurements of test patches associated with spot colors included in the spot color dictionary are compared 226 to their associated target color measurement values or definitions. In this regard, it is noted that spot colors which are outside the producible color gamut of the document processing system should have been redefined, as discussed above, to refer to target measurement values or definitions that are within the range producible by the document processing system.

An updated linked list is now generated. The updated linked list includes at least measurement values and colorant values associated with spot color test patches that are still associated with unacceptably large color errors. Other sets of measurements and colorant values may also be included. For example, colorant recipes and measurement values associated with the perturbation test patches (if produced 218) of the remaining spot colors of interest may be included 230 in the linked list. Additionally, or alternatively, measurements associated with spot colors and perturbation test patches associated with spot colors that are not associated with color errors that are acceptable may also be included 230 in the linked list. Determining 234, transforming 238 and updating 240 proceed as described above, but based on the values in the updated linked list and producing revised spot color dictionary entries.

Figure 3:
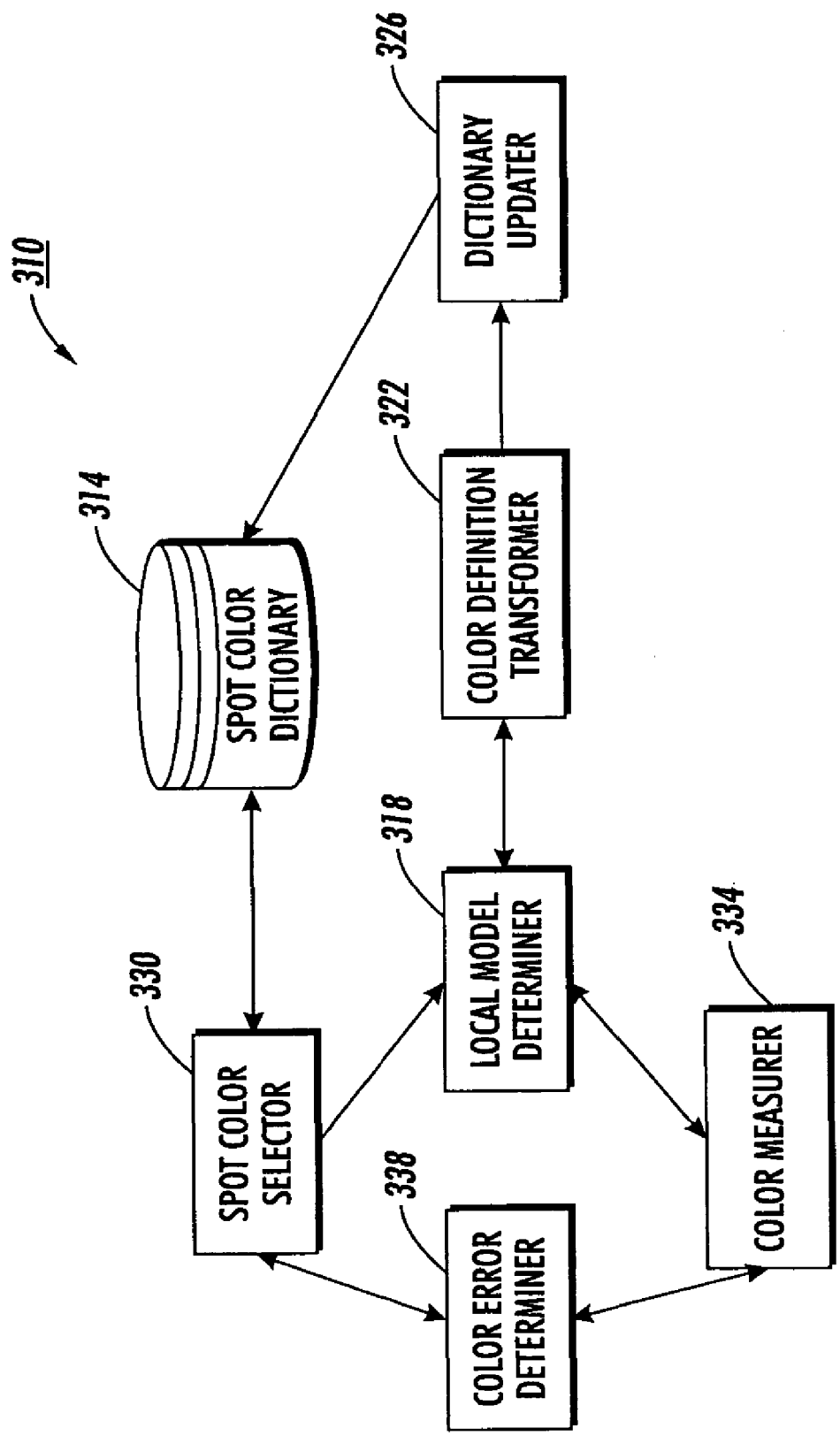
FIG. 3 is a block diagram of aspects of a document processing system operative to perform embodiments of the method of FIG. 1.

Referring to FIG. 3, an illustrative document processing system 310 that can be operative to perform the method 110 or illustrative embodiment 210 for updating a spot color dictionary of spot color recipes associated with the document processing system includes a spot color dictionary 314. Additionally, the system 310 includes a local model determiner 318, a color definition transformer 322 and a dictionary updater 326. The document processing system 310 also includes other main document processing functions and functional blocks therefor (not shown) including, for example, printing documents.

The spot color dictionary 314 includes spot color entries which associate colorant recipes with spot color definitions or target color measurement values. Additionally, each entry may be associated with flags and/or pointers which may indicate the presence and location of alternative or temporary color definitions or target color measurement values. The spot color dictionary 314 is included in the document processing system 310 as a computer file or database or as information stored in a computer memory, local disc drive (hard or floppy) or that is accessed over a computer communication device such as a computer network.

The local model determiner 318 is operative to determine 114, 234 localized models of color production behavior of the document processing system 310 based on a weighted analysis of color production measurements (e.g., Eq. (1), neural networks, etc). In determining 114, 234 the localized models, color production measurements associated with colors that are located in color space relatively close to a point in color space associated with a target spot color for which a localized model is being determined are given a greater weight than are color production measurements associated with colors that are located in color space relatively far from the point in color space of the target spot color. The localized models determined 114, 234 by the local model determiner 318 relate color definitions to colorant recipes.

The color definition transformer 322 is operative to receive a color definition associated with a target spot color and the determined 114, 234 localized model determined for the target spot color. For instance, the color definition transformer 322 may receive this information from the local model determiner 318. The color definition transformer 322 uses this information to determine an updated colorant recipe for the spot color definition of the target spot color. For instance, the color definition transformer 322 transforms 118,238 the spot color definition of the target spot color using the determined 114, 234 localized model which was determined 114, 234 for the target spot color (e.g., Eq. (2)).

The dictionary updater 326 is operative to receive the updated colorant recipe from the color definition transformer 322 and use that information to update 122, 240 the spot color dictionary entry for the target spot color based on that information, thereby updating 122, 240 the colorant recipe associated with the definition of the target spot color. In some embodiments, the dictionary updater is operative to determine or to receive an alternative spot color definition and/or target color measurement value for a spot color dictionary entry. For instance, if a colorant recipe for a target spot color is outside the producible gamut of a rendering device or printer associated with the document processing system 310, the dictionary updater 326 may receive or determine a replacement or alternative spot color definition that describes a closest or most similar producible or within gamut alternative to the out of gamut spot color. In some embodiments, the dictionary updater 326 may overwrite the color definition or target color measurement value of the target spot color entry in question. In other embodiments, the dictionary updater 326 may add or set a flag and/or add or provide a pointer to the color dictionary entry for the target spot color in question, which indicates that a temporary alternative color definition or target color measurement value is available for the target spot color and should be used instead of the permanent target spot color definition included in the spot color entry. In such embodiments, the dictionary updater 326 is also responsible for resetting the flag or removing the pointer if or when it is determined that the document processing system 310 is once again capable of producing the target spot color according to the original or permanent spot color definition or target color measurement value.

Some embodiments include a spot color selector 330. For example, the spot color selector 330 may receive an indication of spot colors to be included in an upcoming print job. Accordingly, the spot color selector 330 selects spot color entries from the spot color dictionary 314 and directs the local model determiner to determine 114, 234 localized models for the spot colors of the selected entries so that colorant recipes associated with the entries can be updated 122, 240 by the dictionary updater 326 where necessary.

Additionally, or alternatively, the spot color selector 330 may select spot colors for modeling (i.e., 134, 234) based on a color error determination (e.g., 226). The color error information may be provided by a system operator or associate thereof. For instance, an offline color sensor may be used to determine which colors require updating (122, 240). The spot color selector 330 may provide an interface for receiving that information. Alternatively, the spot color selector 330 may receive spot color information and associated color measurement values from the system operator or associate and compare 226 those values to target measurement values or definitions associated with the spot colors to determine which spot colors should be updated 122, 240.

Additionally, or alternatively, the system 310 includes a color measurer and/or a color error determiner 338. For example, the spot color selector 330 may make an initial selection of spot colors for consideration. For example, the spot color selector 330 may select all of the spot colors included in the spot color dictionary 314. Alternatively, the spot color selector 330 may select a subset of the spot color entries included in the spot color dictionary 314. For instance, the spot color selector 330 may select only those spot colors to be included in an upcoming print job. In any case, the spot color selector 330 may request the color error determiner 338 to compare 226 respective measured colors to respective target color measurement values associated with the initially selected spot colors. Accordingly, the color error determiner 338 may direct the color measurer 334 to measure colors of color patches associated with the initially selected spot colors.

For example, the color measurer is operative to orchestrate a production of a respective test patch according to the respective spot color colorant recipe of each selected respective spot color of the spot color dictionary and to measure a respective color of each respective test patch, thereby determining a respective measured color value for each respective test patch. Accordingly, the color error determiner 338 is operative to receive the respective measured color value for each respective test patch and to compare each respective measured color value to a respective spot color target color measurement value associated with the respective spot color recipe, thereby determining a respective color error associated with each respective spot color recipe.

Based on the determined color errors, the spot color selector 330 may select a subset of the initially selected spot colors for updating 122, 240. For example, the spot color selector 330 may select only those spot colors associated with an unacceptably large color error. Accordingly, the spot color selector 330 requests or directs the local model determiner 318 to determine local models for a reduced set of spot colors of interest.

For example, the local model determiner 318 may determine 118, 234 the local models based on some or all of the color measurements made by the color measurer 334 for the purposes of the color error determiner 338. Additionally, or alternatively, the local model determiner 318 may be operative to direct a color measurer 334 to orchestrate a production of respective test patches according to the respective spot color colorant recipe of each selected respective spot color of the spot color dictionary, to orchestrate the production of at least one respective perturbation test patch based on a perturbation from the respective spot color colorant recipe or based on a perturbation from a spot color target measurement value associated with the respective spot color colorant recipe that is transformed by the color definition transformer 322 through a determined respective localized model and to measure a respective color of each respective test patch and each respective perturbation test patch, thereby determining a respective measured color value for each respective test patch and perturbation test patch. The local model determiner then uses the colorant recipes and measured color values associated with the test patches generated according to those recipes to determine 114, 234 respective localized models for each of the respective spot colors of interest based on a weighted evaluation of the color production behavior of the document processing system. In this weighted evaluation, respective measured color value data of respective test patches and perturbation test patches associated with colors that are relatively close in color space to a respective color space position of the respective spot color for which the respective localized model is being determined is given a higher weight than is respective measured color value data of respective test patches and perturbation test patches associated with colors that are relatively far from the respective color space position of the respective spot color for which the respective model is determined.

The color measurer 334 may orchestrate the production of perturbation test patches such that a magnitude and/or direction (in color space) of the perturbation is a function of a magnitude and/or direction of the respective color error associated with the respective test patch. The perturbation may simply be proportional to the magnitude of the respective color error or may be based on other functions of the error. Alternatively, the magnitude and/or direction of the perturbation may be based on a pre-selected set of fixed offsets from colorant values of, or associated with, the respective colorant recipe of the respective target spot color.

For example, the local model determiner 318 may use moving matrix interpolation (e.g., Eq. 1) to determine a transformation matrix for transforming machine-independent color descriptions or definitions into machine-dependent colorant values according to the behavior of the document processing system in the vicinity of color space local to the location in color space of the target spot color for which the model is being determined. Alternatively, other modeling techniques may be used, such as, for example, neural networks.

The various functional blocks (318, 322, 326 and, optionally, 330, 334, 338) of the system 310 may be implemented in various combinations of hardware and software. Additionally, the various functions of the functional blocks can be provided in other architectures or arrangements. The arrangement shown is illustrative only.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

The phrase "document processing system," as used herein, encompasses any apparatus, such as digital printer or press, a digital copier, book making machine, facsimile machine, multi-function machine, etc. which performs a print outputting function for any purpose.

Although a cyan, magenta, yellow, black (CMYK) document processing system has been described in the specification, the claims can encompass embodiments that print in fewer, additional and/or other colorants.

The invention claimed is:

1. A method for updating a spot color dictionary of spot color recipes associated with a document processing system, the method comprising:

determining, for each respective spot color of interest of the spot color dictionary, a respective localized model of a color production behavior of the document processing system, wherein each respective localized model is determined based on a weighted evaluation of the color production behavior of the document processing system, wherein data regarding the production of colors that are relatively close in color space to a respective color space position of the respective spot color for which the respective localized model is being determined is given a higher weight than is data regarding the production of colors that are relatively far from the respective color space position of the respective spot color for which the respective model is being determined;

transforming, by the document processing system, respective color definition information of each respective spot color, for which a respective localized model is determined, through the respective localized model, thereby determining a respective updated colorant recipe for each respective spot color; and updating respective spot color dictionary entries of the spot color dictionary, for the respective spot colors, according to the respective determined updated colorant recipes;

wherein determining, for each respective spot color of interest of the spot color dictionary, a respective localized model of a color production behavior of the document processing system further comprises:

producing a respective test patch according to a respective spot color colorant recipe of each selected respective spot color of the spot color dictionary;

producing at least one respective perturbation test patch based on a perturbation from the respective spot color recipe or based on a perturbation from a spot color target color measurement value associated with the respective spot color recipe that is transformed through the determined respective localized model;

measuring a respective color of each respective test patch and each respective perturbation test patch, thereby determining a respective measured color value for each respective test patch and perturbation test patch; and determining, for each respective spot color of interest of the spot color dictionary, the respective localized model of the color production behavior of the document processing system based on the respective measured color value for each respective test patch and perturbation test patch based on a weighted evaluation of the color production behavior of the document processing system, wherein respective measured color value for each respective test patch and perturbation test patch data regarding the production of colors that are relatively close in color space to a respective color space position of the respective spot color for which the respective localized model is being determined is given a higher weight than is respective measured color value for each respective test patch and perturbation test patch data regarding the production of colors that are relatively far from the respective color space position of the respective spot color for which the respective model is being determined.

2. The method of claim 1 wherein determining, for each respective spot color of interest of the spot color dictionary, a respective localized model of a color production behavior of the document processing system comprises:

determining a respective color error associated with selected respective spot colors of the spot color dictionary; and determining, for respective spot colors associated with an undesirably large color error, a respective localized model of a color production behavior of the document processing system.

3. The method of claim 2 wherein determining a respective color error associated with selected respective spot colors of the spot color dictionary comprises:

producing a respective test patch according to a respective spot color colorant recipe of each selected respective spot color of the spot color dictionary;

measuring a respective color of each respective test patch, thereby determining a respective measured color value for each respective test patch; and comparing each respective measured color value to a respective spot color target color measurement value associated with the respective spot color recipe, thereby determining a respective color error associated with each respective spot color recipe.

4. The method of claim 1 wherein producing at least one respective perturbation test patch comprises:

producing at least one respective perturbation test patch wherein at least one of a magnitude and a direction of the perturbation is at least one of: a function of a magnitude of the respective updated color error associated with the respective updated test patch, a function of a direction of the respective updated color error associated with the respective updated test patch, proportional to the magnitude of the respective color error associated with the respective test patch and based on a pre-selected set of fixed offsets from colorant values of the respective set of colorant values.

5. The method of claim 1 wherein determining a respective model for the behavior of the document processing system respectively localized for each respective spot color comprises:

using moving matrix interpolation to determine a transformation matrix for transforming machine independent color descriptions into machine dependent colorant values according to the behavior of the document processing system in a vicinity of color space local to a location in color space of the spot color for which the model is being determined.

6. The method of claim 1 wherein determining a respective model for the behavior of the document processing system respectively localized for each respective spot color comprises:

using a neural network to determine a transformation for transforming machine independent color descriptions into machine dependent colorant values according to the behavior of the document processing system in a vicinity of color space local to a location in color space of the spot color for which the model is being determined.

7. The method of claim 1 wherein updating respective spot color dictionary entries further comprises:

determining that a respective spot color associated with a respective spot color definition cannot currently be achieved; and replacing the respective spot color definition of the respective determined unachievable spot color with an achievable replacement definition, or providing an alternate achievable spot color definition in association with the respective determined unachievable spot color.

8. A method for updating a spot color dictionary of spot color recipes associated with a document processing system, the method comprising:

selecting at least one respective spot color recipe from the spot color dictionary for evaluation, wherein each respective spot color recipe includes a respective set of colorant values for producing a respective spot color and is associated with a respective spot color target color measurement value;

producing, by the document processing system, at least one respective test patch according to the selected at least one respective spot color recipe;

measuring a respective color of each respective test patch, thereby determining a respective measured color value for each respective test patch;

comparing each respective measured color value to the respective spot color target color measurement value associated with the respective spot color recipe, thereby determining a respective color error associated with each respective spot color recipe;

including the respective set of colorant values and the respective measured color value of each respective test patch in a linked list, for each respective spot color having a respective spot color recipe that is associated with a color error that is above a predetermined color error threshold;

determining a respective localized model of local color production behavior of the document processing system, the respective localized model being respectively localized for each respective spot color having a respective spot color recipe that is associated with a color error that is above the predetermined color error threshold based on a weighting of information included in the linked list, wherein the weighting of the information included in the linked list is a respective weighting of information associated with each respective member of the linked list and wherein the respective weighing is a function of a color distance between the respective spot color target color measurement value associated with the respective spot color for which the respective localized model is being determined and the respective measured color value associated with the respective member of the linked list, wherein information regarding respective members of the linked list associated with a relatively shorter color distance to the respective spot color target color measurement value associated with the respective spot color for which the model is being determined is given a relatively higher weight and wherein information regarding respective members of the linked list associated with a relatively longer color distance to the respective spot color target color measurement value associated with the respective spot color for which the model is being determined is given a relatively lower weight;

transforming the respective spot color target color measurement value associated with each respective spot color having a respective spot color recipe that is associated with a color error that is above the predetermined color error threshold through the determined respective localized model, thereby determining a respective revised set of colorant values for each respective spot color having a respective spot color recipe that was associated with color error that was above the predetermined color error threshold; and updating the spot color dictionary entry for the respective spot color for which the respective localized model was determined with the determined respective updated set of colorant values.

9. The method of claim 8 wherein including the respective set of colorant values and the respective measured color value of each respective test patch in the linked list, for each respective spot color having a respective spot color recipe that is associated with a color error that is above the predetermined color error threshold comprises:
including the respective set of colorant values and the respective measured color value of each respective test patch in a linked list that also includes respective sets of colorant values and respective measured color values of respective spot colors having respective spot color recipes that are associated with color errors that are equal to or below the predetermined color error threshold.

10. The method of claim 8 further comprising:
producing at least one respective updated test patch according to the at least one respective updated spot color recipe;
measuring a respective color of each respective updated test patch, thereby determining a respective updated measured color value for each respective test patch;
comparing each respective updated measured color value to the respective spot color target color measurement value associated with the respective updated test patch, thereby determining a respective updated color error associated with each respective spot color recipe;
including the respective updated set of colorant values and the respective updated measured color value of each respective updated test patch in an updated linked list, for each respective spot color having a respective updated spot color recipe that is associated with an updated color error that is above the predetermined color error threshold;
determining a respective updated localized model for the behavior of the document processing system respectively localized for each respective spot color having a respective updated spot color recipe that is associated with the updated color error that is above the predetermined color error threshold based on an updated weighting of information included in the updated linked list, wherein the updated weighting of the information included in the updated linked list is a respective weighting of information associated with each respective member of the updated linked list and wherein the updated weighing is a function of a color distance between the respective spot color target color measurement value associated with the respective spot color for which the respective localized model is being determined and the respective updated measured color value of each respective member of the updated linked list, wherein information regarding respective members of the updated linked list associated with a relatively shorter color distance to the respective spot color target color measurement value associated with the respective spot color for which the model is being determined is given a relatively higher weight and information regarding respective members of the updated linked list associated with a relatively longer color distance to the respective spot color target color measurement value associated with the respective spot color for which the model is being determined is given a relatively lower weight;
transforming the respective spot color target color measurement value associated with each respective spot color having a respective updated spot color recipe that is associated with an updated color error that is above the predetermined color error threshold through the determined respective updated localized model, thereby determining a respective revised set of colorant values for each respective spot color having a respective updated spot color recipe that is associated with an updated color error that is above the predetermined color error threshold; and
updating the spot color dictionary entry for the respective spot color for which the respective localized model was determined with the determined respective revised set of colorant values.

11. The method of claim 8 wherein producing the at least one respective test patch comprises:
producing at least one respective perturbation test patch based on a perturbation from the at least one respective spot color recipe or based on a perturbation from the spot color target color measurement value associated with the respective spot color recipe that is transformed through the determined respective localized model.

12. The method of claim 11 wherein producing at least one respective perturbation test patch comprises:
producing at least one respective perturbation test patch wherein at least one of a magnitude and direction of the perturbation is at least one of: a function of a magnitude of the respective updated color error associated with the respective updated test patch, a function of a direction of the respective color error associated with the respective updated test patch, proportional to the magnitude of the respective color error associated with the respective test patch and based on a pre-selected set of fixed offsets from colorant values of the respective set of colorant values.

13. The method of claim 8 wherein updating the spot color dictionary entry for the respective spot color further comprises:
determining that the respective spot color target color measurement value associated with the respective spot color cannot currently be achieved; and
replacing the determined unachievable respective spot color target color measurement value with an achievable replacement respective spot color target color measurement value, or providing an alternate achievable spot color target color measurement value in association with the respective determined unachievable respective spot color target color measurement value.

14. The method of claim 8 wherein determining a respective model for the behavior of the document processing system respectively localized for each respective spot color comprises:
using moving matrix interpolation to determine a transformation matrix for transforming machine independent color descriptions into machine dependent colorant values according to the behavior of the document processing system in a vicinity of color space local to a location in color space of the spot color for which the model is being determined.

15. The method of claim 8 wherein determining a respective model for the behavior of the document processing system respectively localized for each respective spot color comprises:
using a neural network to determine a transformation for transforming machine independent color descriptions into machine dependent colorant values according to the behavior of the document processing system in a vicinity of color space local to a location in color space of the spot color for which the model is being determined.

16. A document processing system comprising:
a spot color dictionary including spot color entries associating colorant recipes with spot color definitions;
a local model determiner that is operative to determine localized models of a color production behavior of the document processing system based on a weighted analysis of color production measurements, wherein color production measurements associated with colors that are located in color space relatively close to a point in color space associated with a target spot color for which the localized model is being determined are given a greater weight than are color production measurements associated with colors that are located in color space relatively far from the point in color space of the target spot color, wherein the localized models relate color definitions to colorant recipes;

a color definition transformer that is operative to receive a color definition associated with the target spot color and the determined localized model determined for the target spot color and determine an updated colorant recipe for the spot color definition of the target spot color using the localized model determined for the target spot color;

a dictionary updater that is operative to receive the updated colorant recipe from the color definition transformer and to update the spot color dictionary entry for the target spot color, thereby updating the colorant recipe associated with the definition of the target spot color;

a color error determiner that is operative to determine a respective color error associated with respective spot colors of interest; and a spot color selector that is operative to select for updating those spot colors having an undesirably large color error; and a color measurer that is operative to orchestrate a production of a respective test patch according to the respective spot color colorant recipe of each selected respective spot color of the spot color dictionary, and to measure a respective color of each respective test patch, thereby determining a respective measured color value for each respective test patch, and wherein the color error determiner is operative to compare each respective measured color value to a respective spot color target color measurement value associated with the respective spot color recipe, thereby determining a respective color error associated with each respective spot color recipe, wherein the local model determiner is operative to direct the color measurer to orchestrate a production of a respective test patch according to the respective spot color colorant recipe of each selected respective spot color of the spot color dictionary, to orchestrate the production of at least one respective perturbation test patch based on a perturbation from the respective spot color colorant recipe or based on a perturbation from a spot color target color measurement value associated with the respective spot color colorant recipe that is transformed by the color definition transformer through the determined respective localized model, and to measure a respective color of each respective test patch and each respective perturbation test patch, thereby determining a respective measured color value for each respective test patch and perturbation test patch and is operative to determine, for each respective spot color of interest, the respective localized model of the color production behavior of the document processing system based on the respective measured color value for each respective test patch and perturbation test patch based on a weighted evaluation of the color production behavior of the document processing system, wherein respective measured color value data of respective test patches and perturbation test patches associated with colors that are relatively close in color space to a respective color space position of the respective spot color for which the respective localized model is being determined is given a higher weight than is respective measured color value data of respective test patches and perturbation test patches associated with colors that are relatively far from the respective color space position of the respective spot color for which the respective model is being determined.

17. The document processing system of claim 16 wherein the color measurer orchestrates the production of the at least one respective perturbation test patch such that at least one of a magnitude and direction of the perturbation is at least one of: a function of a magnitude of the respective updated color error associated with the respective updated test patch, a function of a direction of the respective color error associated with the respective test patch, proportional to the magnitude of the respective color error associated with the respective updated test patch and based on a pre-selected set of fixed offsets from colorant values of the respective colorant recipe of the respective spot color.

18. The document processing system of claim 16 wherein the local model determiner is operative to determine the respective localized model by using moving matrix interpolation to determine a transformation matrix for transforming machine independent color descriptions into machine dependent colorant values according to the behavior of the document processing system in a vicinity of color space local to a location in color space of the target spot color for which the model is being determined.

19. The document processing system of claim 16 wherein the local model determiner is operative to determine the respective localized model by using a neural network to determine a transformation for transforming machine independent color descriptions into machine dependent colorant values according to the behavior of the document processing system in a vicinity of color space local to a location in color space of the target spot color for which the model is being determined.

20. The document processing system of claim 16 wherein the dictionary updater is further operative to receive or determine a replacement or alternative spot color definition that describes an achievable alternative to an unachievable spot color and to overwrite the color definition of the unachievable spot color, or to add or set a flag and/or add or provide a pointer to the color dictionary entry for the unachievable spot color, which indicates that a temporary alternative color definition is available for the unachievable spot color and should be used instead of an original target spot color definition included in the spot color entry.

* * * * *